United States Patent
Zheng et al.

(10) Patent No.: US 7,710,983 B2
(45) Date of Patent: May 4, 2010

(54) METHOD AND APPARATUS FOR DETERMINING INFORMATION ASSOCIATED WITH A PARTICULAR MULTICAST CHANNEL IN A MULTICAST NETWORK

(75) Inventors: Danyang Zheng, Fremont, CA (US); Ping Li, Fremont, CA (US); Jack C. Cham, San Leandro, CA (US); Charles Shen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1348 days.

(21) Appl. No.: 11/112,635

(22) Filed: Apr. 21, 2005

(65) Prior Publication Data

US 2006/0239289 A1   Oct. 26, 2006

(51) Int. Cl.
H04L 12/28 (2006.01)

(52) U.S. Cl. ............ 370/396; 370/432; 370/386; 370/422; 370/408; 370/398

(58) Field of Classification Search ......... 370/256, 370/312, 432, 392, 396, 386, 398, 422, 408
See application file for complete search history.

(56) References Cited

U.S. PATENT DOCUMENTS

| | | | | |
|---|---|---|---|---|
| 5,946,316 | A * | 8/1999 | Chen et al. | 370/408 |
| 5,963,557 | A * | 10/1999 | Eng | 370/432 |
| 6,512,776 | B1 * | 1/2003 | Jones et al. | 370/432 |
| 6,654,371 | B1 * | 11/2003 | Dunstan et al. | 370/390 |
| 6,785,704 | B1 * | 8/2004 | McCanne | 718/105 |
| 6,826,564 | B2 * | 11/2004 | Thompson et al. | 707/4 |
| 6,944,632 | B2 | 9/2005 | Stern | 807/104.1 |
| 6,950,439 | B1 | 9/2005 | Bhagavath et al. | 370/432 |
| 7,061,880 | B2 * | 6/2006 | Basilier | 370/312 |
| 7,107,606 | B2 * | 9/2006 | Lee | 725/87 |
| 7,228,356 | B2 * | 6/2007 | Nguyen et al. | 709/231 |
| 7,236,465 | B2 * | 6/2007 | Banerjee et al. | 370/312 |
| 7,245,614 | B1 * | 7/2007 | Podar et al. | 370/389 |
| 7,349,986 | B2 * | 3/2008 | Takeuchi et al. | 709/243 |
| 7,500,261 | B1 * | 3/2009 | Myers | 725/105 |
| 2004/0100983 | A1 * | 5/2004 | Suzuki | 370/390 |
| 2005/0028219 | A1 * | 2/2005 | Atzmon et al. | 725/116 |
| 2005/0129017 | A1 * | 6/2005 | Guingo et al. | 370/390 |
| 2005/0152370 | A1 * | 7/2005 | Meehan et al. | 370/393 |
| 2005/0220132 | A1 * | 10/2005 | Oman et al. | 370/432 |
| 2005/0259584 | A1 * | 11/2005 | Chen et al. | 370/238 |
| 2006/0083263 | A1 * | 4/2006 | Jagadeesan et al. | 370/487 |
| 2006/0146823 | A1 * | 7/2006 | Ding | 370/390 |

OTHER PUBLICATIONS

Olsen, Stefanie, "Microsoft Interactive TV to track viewers" Dec. 11, 2001, 2 pgs, http://news.com.com/2100-1023-276881.html.

* cited by examiner

*Primary Examiner*—Ricky Ngo
*Assistant Examiner*—Dewanda Samuel
(74) *Attorney, Agent, or Firm*—Stolowitz Ford Cowger LLP

(57) ABSTRACT

A method and apparatus for determining information associated with a particular multicast channel in a multicast network are disclosed. In accordance with the method, a request message requesting information associated with the particular multicast channel is generated and sent to the multicast network. Further, the request message is propagated downstream in a recursive manner via a multicast topology of the multicast network. A response to the request message is propagated upstream via the multicast topology to generate a response message including requested information associated with the particular multicast channel. The information may comprise number of users receiving the particular multicast channel.

26 Claims, 5 Drawing Sheets

METHOD AND APPARATUS FOR DETERMINING INFORMATION ASSOCIATED WITH A PARTICULAR MULTICAST CHANNEL IN A MULTICAST NETWORK

BACKGROUND OF THE INVENTION

1. Field of the Invention

Embodiments of the present invention generally relate to multicast networks. More particularly, embodiments of the present invention relate to method and apparatus for determining information associated with a particular multicast channel in a multicast network.

2. Related Art

Data, voice, and video services have traditionally been delivered to business and residential locations through different mediums (e.g., telephone lines, cable television, broadcast television, data networks, etc.). However, the growth of Internet Protocol (IP) technology now enables the integration and delivery of data, voice, and video through an IP-based network. This integration makes available new revenue generating opportunities to meet the demand from existing customers and new customers for data, voice, and video services through an IP-based network. As the same time, several issues arise in deploying these IP-based networks. In particular, video services provided by IP-based networks pose delivery-type issues and measurement-type issues. The delivery-type issues relate to the manner of delivering the video services while measurement-type issues relate to the manner of tracking or monitoring the number of customers/users receiving the video services.

With respect to delivery-type issues, there are primarily three ways to deliver video services via packets from one node to the other nodes in the IP-based network: unicast, broadcast, and multicast. Unicast delivery requires the source node to address each destination node individually with the destination IP address. If one source node needs to deliver the video services to three destination nodes, for example, the source node has to make three copies of the packets and has to deliver one to each destination node individually. This may be sufficient for low bandwidth video services. However, for delivering typical video services requiring high bandwidth video streams (e.g., multiple megabits per second per stream), it becomes an un-scalable and inefficient solution.

In broadcast delivery, the source node sends one copy of each packet and addresses it to a broadcast IP address. The broadcast IP address is not unique to a destination node. Instead, the broadcast IP address causes the packet to be sent to all downstream nodes within the scope of the broadcast IP address. Each downstream node is required to examine the packets and process them if they are relevant to the downstream node. However, the downstream node disregards the packets if they are not relevant to the downstream node. This may relieve the burden on the source nodes since the source nodes do not have to duplicate the packets for each downstream node. Unfortunately, it leads to a waste of resources at some downstream nodes. That is, if a downstream node does not care about the packets, it still needs to spend resources to examine and discard the packets. The broadcast delivery also wastes network bandwidth as well. In particular, if a node is an intermediate node between the source node and the destination node, the intermediate node needs to forward the packets to its downstream neighbor node, even though its downstream neighbor node may not care about the packet traffic being forwarded to it.

The third delivery method is multicast. Multicast is based on the concept of a multicast group. An arbitrary group of nodes may want to receive a particular packet stream. This group is not limited to any physical or geographical boundaries. A node wanting to receive the particular packet stream being delivered to a multicast group joins the multicast group using a protocol (e.g., the Internet Group Management Protocol (IGMP)). A multicast address specifies a multicast group of nodes that have joined the multicast group and want to receive particular packet stream traffic sent to the multicast group. Another multicast address is utilized for another multicast group having nodes that want to receive different packet stream traffic. That is, each multicast address may be considered to be a separate multicast channel. In multicast delivery, a multicast network is created to control the path that multicast packet traffic takes to deliver the appropriate multicast packets to all nodes of the appropriate multicast group. That is, the multicast network is an IP-based network that utilizes multicast functionality and nodes configured to operate in a multicast network environment to form a multicast distribution tree for appropriately delivering multicast packets to all nodes of the appropriate multicast group. In a multicast network, a source node sends one copy of each packet and addresses it to a multicast address. The multicast network is responsible for forwarding each packet to each node in the multicast group associated with the multicast address.

Since multicast delivery provides efficient use of network bandwidth by delivering packets to the nodes that want to receive them, multicast delivery is the solution for many delivery-type issues raised by offering video services via IP-based networks. Specifically, multicast delivery makes feasible the delivery of broadcast-type video services. A broadcast-type video service refers to video content (e.g., live or recorded programs) delivered on a time schedule to anyone wanting to view the video content, which is analogous to broadcast television or cable television in that the user/viewer tunes to a particular channel to view the video content instead of individually requesting delivery of the video content.

With respect to measurement-type issues, the broadcast-type video service creates the need to track or monitor the number of users receiving particular video content via an IP-based network at any point in time. This information is useful for several reasons. First, the amount of interest in particular video content may be utilized by video content providers in their dealings with advertisers and may be utilized to understand the value placed on the video service by users. Secondly, this information facilitates the efficient allocation of network resources to meet the usage patterns of the video service by users.

Broadcast television and cable television have traditionally relied on several methods to collect viewer information for individual television programs. These traditional methods include placing monitoring devices in selected viewer locations, sending diaries to selected viewers to record television programs viewed, and interviewing by telephone selected viewers about their television viewing patterns. In general, these traditional methods are time-consuming and expensive. Moreover, these traditional methods focus on gathering detailed information from a representative sample of viewers instead of gathering information from all viewers.

While it is possible to use these traditional methods to track or monitor the number of users receiving particular video content via an IP-based network at any point in time, the disadvantages of these traditional methods will not disappear. Moreover, numerous techniques have been developed that utilize the infrastructure of the IP-based network to track or monitor the number of users receiving particular video content via the IP-based network. Unfortunately, these techniques use a significant amount of network bandwidth because they require all nodes of multicast groups to be individually polled by a central monitoring unit or to individually report to the central monitoring unit in a unicast manner, leading to network bandwidth inefficiencies and network traffic bottlenecks. This occurs because even if a node is a member of a multicast group, no user of the video service may actually be receiving the particular video content from the node.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Figure 1:
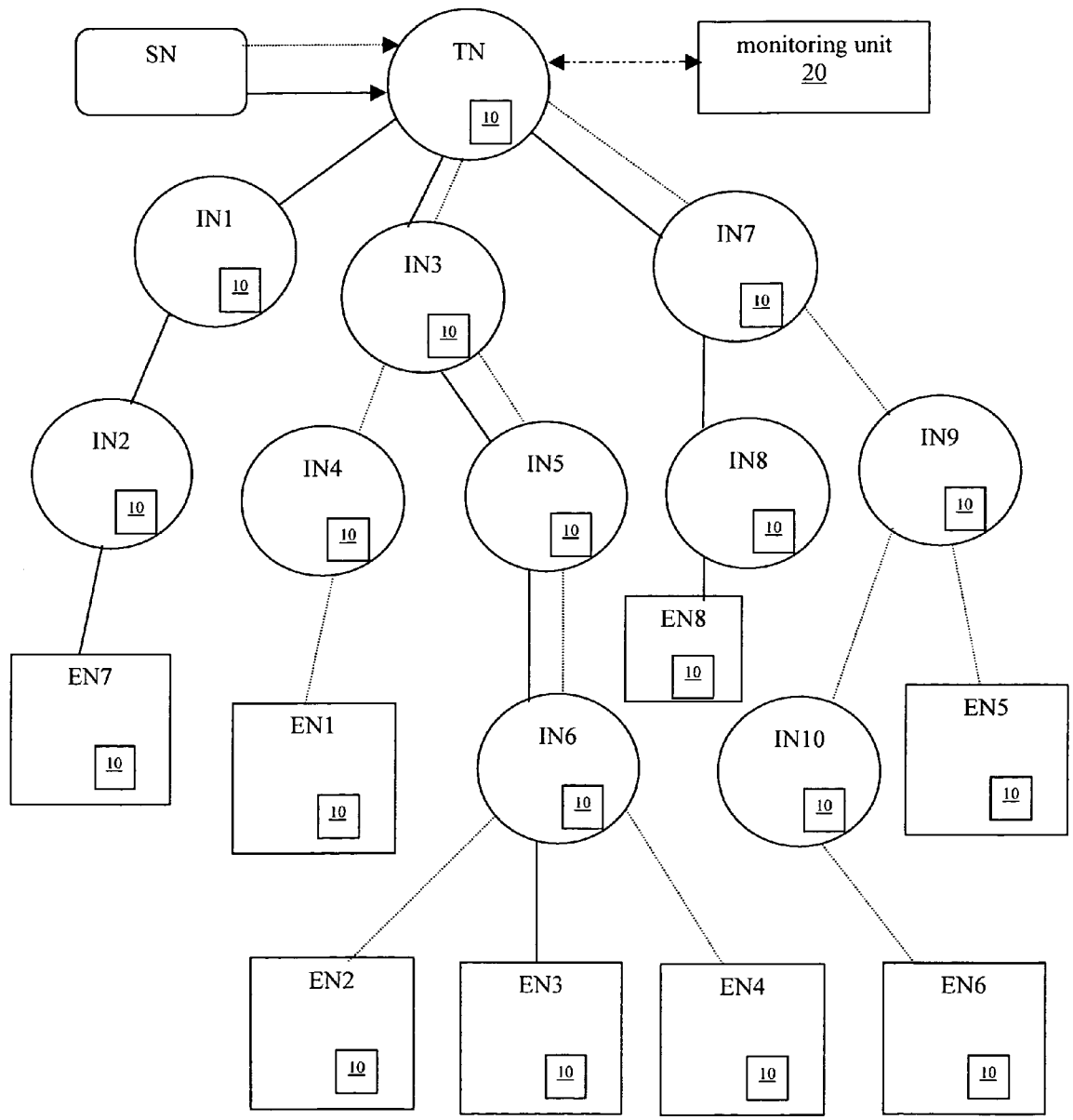
FIG. 1 illustrates a multicast network in accordance with an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Unlike the methods and techniques discussed above for determining information related to use of a video service provided by an IP-based network, the present invention is directed to determining that information (information related to use of a video service provided by an IP-based network) in a network bandwidth efficient manner that saves time and resources (financial and network). Although the discussion will focus on determining the number of users receiving video content via a particular multicast channel of a multicast network at a particular point in time, the invention is also applicable to determining other types of information and is applicable to other types of networks. This information is useful in gaining an understanding of the popularity of video content delivered via any of the multicast channels of the multicast network. Moreover, this information is useful to help run a more efficient multicast network based on video service usage patterns of the users.

As discussed above, multicast delivery is more efficient than unicast delivery or broadcast delivery for delivering video content since particular video content is delivered only to users that have joined or subscribed to a particular multicast channel providing the particular video content. In general, the multicast delivery mechanism establishes efficient network paths to deliver the video content to the users. The user receives the video content through some type of device. This device is made a member of the multicast group associated with the particular multicast channel, wherein the device represents a type of end node. As discussed above, multicast delivery makes feasible the broadcast-type video service, which refers to delivering video content (e.g., live or recorded programs) on a time schedule to anyone wanting to view the video content. That is, each multicast channel may deliver broadcast-type video, which is analogous to a broadcast television channel or cable television channel.

Rather than designing new mechanisms and network paths to collect information from the multicast network, the existing multicast delivery mechanism and network paths used by the multicast channels are utilized to query and determine the number of users receiving video content via the multicast channels of the multicast network at any point in time. That is, queries for information submitted to the multicast network will follow the efficient and effective network paths already established by the multicast network. Moreover, a query for information about a specific multicast channel will only reach nodes subscribed to the specific multicast channel. A top node (associated with the specific multicast channel) may receive the query and then send it to one or more downstream nodes based on the multicast topology of the multicast network and the specific multicast channel. Each downstream node sends the query to respective downstream nodes based on the multicast topology of the multicast network and the specific multicast channel. This downstream query process proceeds in a recursive manner and continues until the end nodes of the specific multicast channel are reached.

The response (including the requested information) to this query for information will traverse the same path that the query traverses but in the reverse direction. That is, the path of the response will move upstream (towards the video content source node) while the path of the query will move downstream (away from the video content source node). In particular, each node associated with a specific multicast channel will send a response to a respective upstream node that had originally forwarded downstream the query to the node. At the upstream node, the requested information from the responses is accumulated and then sent in a response to another upstream node that had originally forwarded downstream the query to the upstream node. This upstream response process continues until a top node is reached. The top node accumulates the requested information from received responses and sends it in a response to the source of the query for information. This response then has the number of users receiving video content via a specific multicast channel of the multicast network at a point in time.

FIG. 1 illustrates a multicast network 100 in accordance with an embodiment of the present invention. In general, the topology of an IP-based network can be very complex. There are numerous variants for a link (e.g., DSL, 10/100/1000 Ethernet, optical etc.) to the IP-based networks. The link can be connected in accordance with one of various physical topologies (e.g., star topology, mesh topology, point-to-point topology, etc.). One characteristic of implementing the multicast network 100 over a physical network is that regardless of what the physical topology might be, each multicast group of the multicast network 100 always follows a logical tree structure, wherein each multicast group has an associated multicast address representing a multicast channel. As depicted in FIG. 1, the logical tree structure starts from source node SN and propagate down to its leaves and the leaves that follow the leaves, etc.

The multicast topology of the multicast network 100 includes a source node, a top node TN, a plurality of intermediate nodes IN1-IN10, a plurality of end nodes EN1-EN8, and a monitoring unit 20. It should be understood that other multicast topologies are possible. The top node TN, the intermediate nodes IN1-IN10, and the end nodes EN1-EN8 include a network interface configured to operate in a multicast network and a multicast channel monitoring module 10 implemented in hardware, software, or a combination thereof. Further, source node SN, the top node TN, the intermediate nodes IN1-IN10, and the end nodes EN1-EN8 are configured to operate in the multicast network 100, which supports multicast channel A and multicast channel B.

One network path for multicast channel A includes the top node TN, intermediates nodes IN1 and IN2, and end node EN7. Another network path for multicast channel A includes the top node TN, intermediates nodes IN3, IN5, and IN6, and end node EN3. Yet another network path for multicast channel A includes the top node TN, intermediates nodes IN7 and IN8, and end node EN8.

One network path for multicast channel B includes the top node TN, intermediates nodes IN3 and IN4, and end node EN1. Other network paths for multicast channel B include the top node TN, intermediates nodes IN3, IN5, and IN6, and end node EN2 or end node EN4. Yet another network path for multicast channel B includes the top node TN, intermediates nodes IN7 and IN9, and end node EN5. Still, yet another network path for multicast channel B includes the top node TN, intermediates nodes IN7, IN9, and IN10, and end node EN6.

The source node SN is the source of content (e.g., video content) for the multicast channels A and B. For example, source node SN may be a live TV acquisition station. It may take in analog TV feeds from over-the-air antenna, or from a satellite feed. In an embodiment, the incoming program streams from the feeds are encoded, compressed, and placed onto some transport streams (e.g., MPEG-2/transport stream/ UDP, or AVC/RTP/UDP). Each program stream is then sent with its own multicast address out onto the tree structure of multicast network 100, wherein each multicast address corresponds to a multicast channel. In another embodiment, the source node SN may represent another subnet where the multicast streams are already available and fed to source node's SN output.

Multicast channel A represented by the solid line and multicast channel B represented by the broken line demonstrate the concept of mixed multicast channel subscription. They may be two different multicast transmission paths (e.g., solid line represents the path for all the packets destined for multicast address 224.10.10.4 will follow, broken line represents the path for all the packets destined for multicast address 224.30.30.1 will follow).

The monitoring unit 20 enables the generation of a request message requesting information associated with a particular multicast channel of the multicast network 100. For example, the requested information may be the number of users receiving a specific multicast channel (and its content) of the multicast network 100 at a point in time. Further, the monitoring unit 20 enables the request message to be sent to the multicast network 100. In practice, a separate request message is generated for each multicast channel. In an embodiment, the generation of the request message may be prompted by a network operator of the multicast network 100. In another embodiment, the request message may be automatically generated at specific time intervals so that a graph of the requested information may be created. Furthermore, the monitoring unit 20 receives the response (including the requested information) from the multicast network 100.

Continuing, the top node TN is the first node in the multicast network 100 to receive the request message from the monitoring unit 20. The top node TN initiates the propagation downstream of the request message in a recursive manner via the multicast topology of the multicast network 100. In particular, the top node TN generates an other request messages for downstream network nodes (e.g., intermediate nodes IN1, IN 3, and IN7) depending on the multicast channel from which information is sought. Further, the top node TN is the last node in the multicast network 100 and generates the response message including the requested information for sending to the monitoring unit 20, wherein this response message accumulates the results from the responses received by the top node TN from downstream nodes (e.g., intermediate nodes IN1, IN 3, and IN7). In an embodiment, the top node TN is a router. Alternatively, the top node TN is a switch that has some hardware/software intelligence to process the request message and to accumulate the results from responses received by the top node TN from downstream nodes into a response message for the monitoring unit 20.

The intermediate nodes IN1-IN10 may be routers or switches. They participate in propagating downstream the request message from the monitoring unit 20 and in propagating upstream the response for the monitoring unit 20.

Again referring to FIG. 1, the end nodes EN1-EN8 represent the last leaves on the multicast tree structure. In an embodiment, an end node may be a residential gateway (RG) device. Alternatively, an end node may be a set-top-box (STB) or a computer. Typically, the user receives a multicast channel from an end node.

Further, the multicast channel monitoring module 10 facilitates a node (e.g., top node, intermediate node, or end node) to propagate downstream the request message requesting information associated with a multicast channel of the multicast network 100 in a recursive manner via a multicast topology of the multicast network 100. Moreover, the multicast channel monitoring module 10 facilitates the node (e.g., top node, intermediate node, or end node) to propagate upstream a response to the request message via the multicast topology to generate a response message including the requested information associated with the multicast channel.

As will be described below, the request messages take the downstream path of the multicast traffic for a specific multicast channel once. Further, the response travels up the multicast topological tree once. These two characteristics make sure a minimum network traffic overhead is imposed on the multicast network 100 as a whole.

Figure 2:
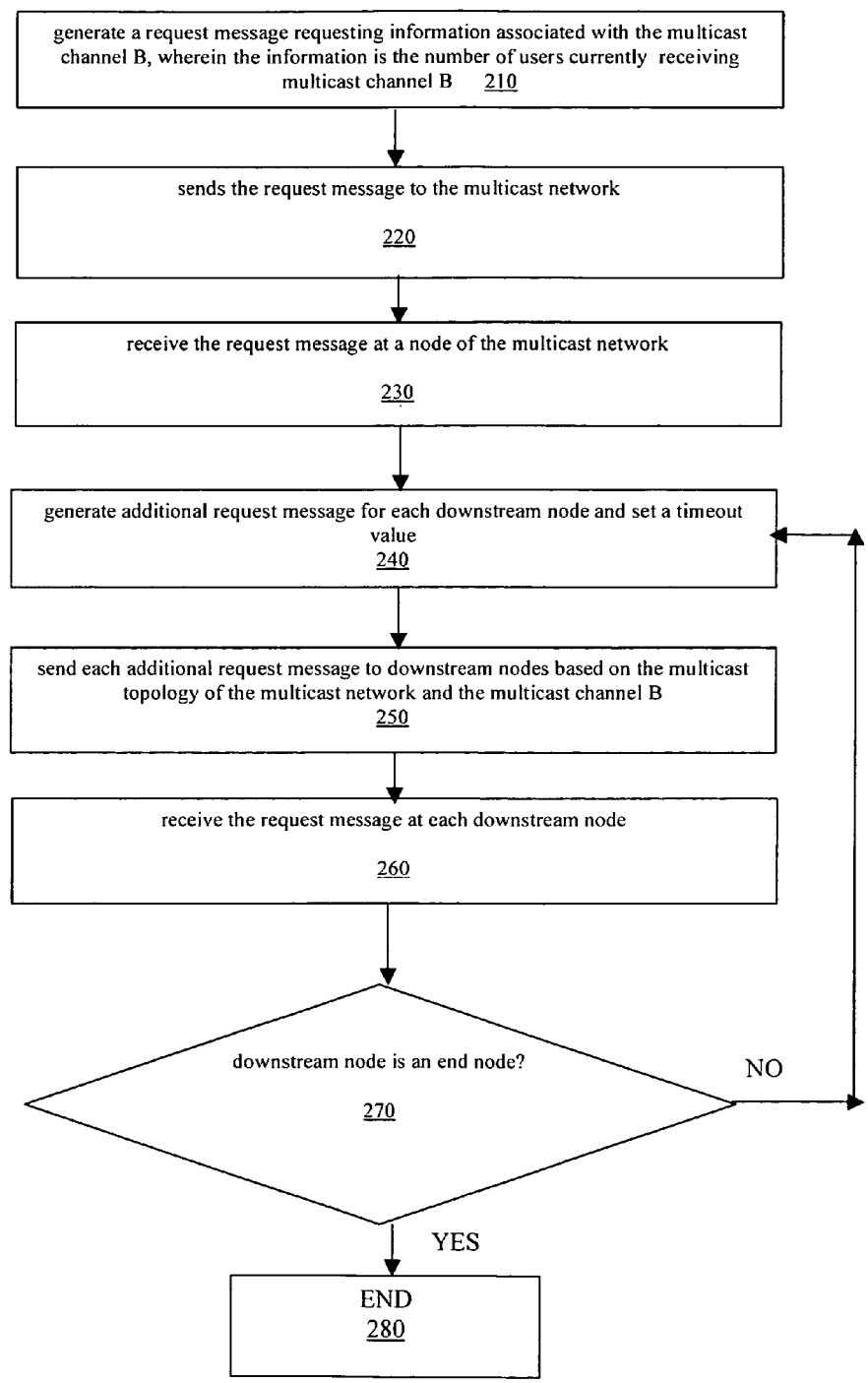
FIG. 2 illustrates a flow chart showing a request phase of a method of determining information associated with a particular multicast channel in a multicast network in accordance with an embodiment of the present invention.
Figure 3:
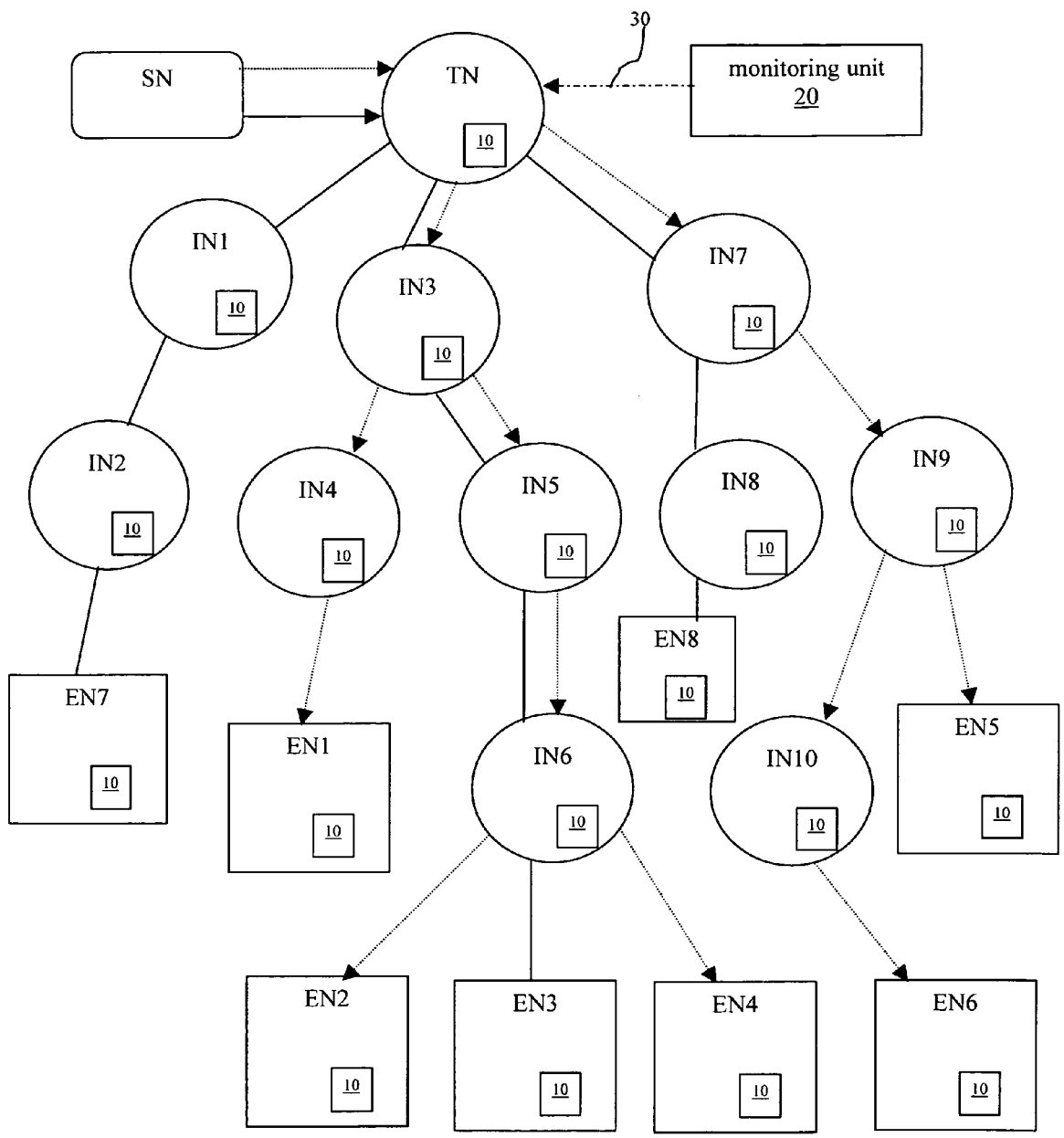
FIG. 3 illustrates the request phase of FIG. 2 performed in a multicast network in accordance with an embodiment of the present invention.

FIG. 2 illustrates a flow chart 200 showing a request phase of a method of determining information associated with a particular multicast channel in a multicast network in accordance with an embodiment of the present invention. Reference is made to FIG. 3, which illustrates the request phase of FIG. 2 performed in a multicast network 100 in accordance with an embodiment of the present invention. In an embodiment, the present invention is implemented as computer-executable instructions for performing the request phase of this method. The computer-executable instructions can be stored in any type of computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

Here, the particular multicast channel is multicast channel B. Moreover, the information is the number of users currently receiving multicast channel B.

At Block 210, the monitoring unit 20 generates a request message 30 (FIG. 3) requesting information associated with the multicast channel B, wherein the information is the number of users currently receiving multicast channel B. The generation of the request message 30 may be prompted by a network operator of the multicast network 100. Alternatively, the request message 20 may be automatically generated at specific time intervals so that a graph of the requested information may be created.

Continuing, at Block 220, the monitoring unit 20 sends the request message 30 to the multicast network 100.

At Block 230, a node of the multicast network 100 receives the request message 30. Here, the top node TN receives the request message 30. The top node TN initiates the propagation downstream of the request message 30 in a recursive manner via the multicast topology of the multicast network 100. Alternatively, the request message 30 may be sent to any node of the multicast network. This enables the determination of localized information about a specific multicast channel.

Further, at Block 240, the node generates an additional request message for each downstream node that is in a network path of multicast channel B and that is below the node. Each additional request message requests the number of users currently receiving multicast channel B. In FIG. 3, the top node TN generates additional request messages for intermediate nodes IN3 and IN7. Also, at Block 240, the node (top node TN from FIG. 3) sets a timeout value.

Moreover, at Block 250, the node sends each additional request message to its downstream nodes based on the multicast topology of the multicast network and the multicast channel B. In FIG. 3, the top node TN utilizes the multicast address for multicast channel B to send each additional request message to intermediate nodes IN3 and IN7 respectively. That is, the additional request messages use the established downstream network paths utilized by multicast traffic for multicast channel B. Thus, the additional request messages are sent the same way as the multicast traffic for multicast channel B. Each additional request message indicates which node (top node TN from FIG. 3) sent the messages to provide a trace for the downstream node to send back a response message later on.

At Block 260, each downstream node receives the request message sent by the node. In FIG. 3, intermediate nodes IN3 and IN7 receive the request messages sent by the top node TN. At Block 270, it is determined whether any downstream node from Block 260 is an end node. If the downstream node is an end node, the bottom of a downstream network path for multicast channel B is reached, terminating the request phase for this downstream network path for multicast channel B. If the downstream node is not an end node, Blocks 240-270 are repeated using the downstream node. When the bottom of each downstream network path for multicast channel B is reached, the entire request phase ends at Block 280. In FIG. 3, the downstream nodes (e.g., intermediate nodes IN3 and IN7) are not end nodes. Thus, Blocks 240-270 are repeated until end nodes EN1, EN2, EN4, EN5, and EN6 of multicast channel B are reached.

Figure 4:
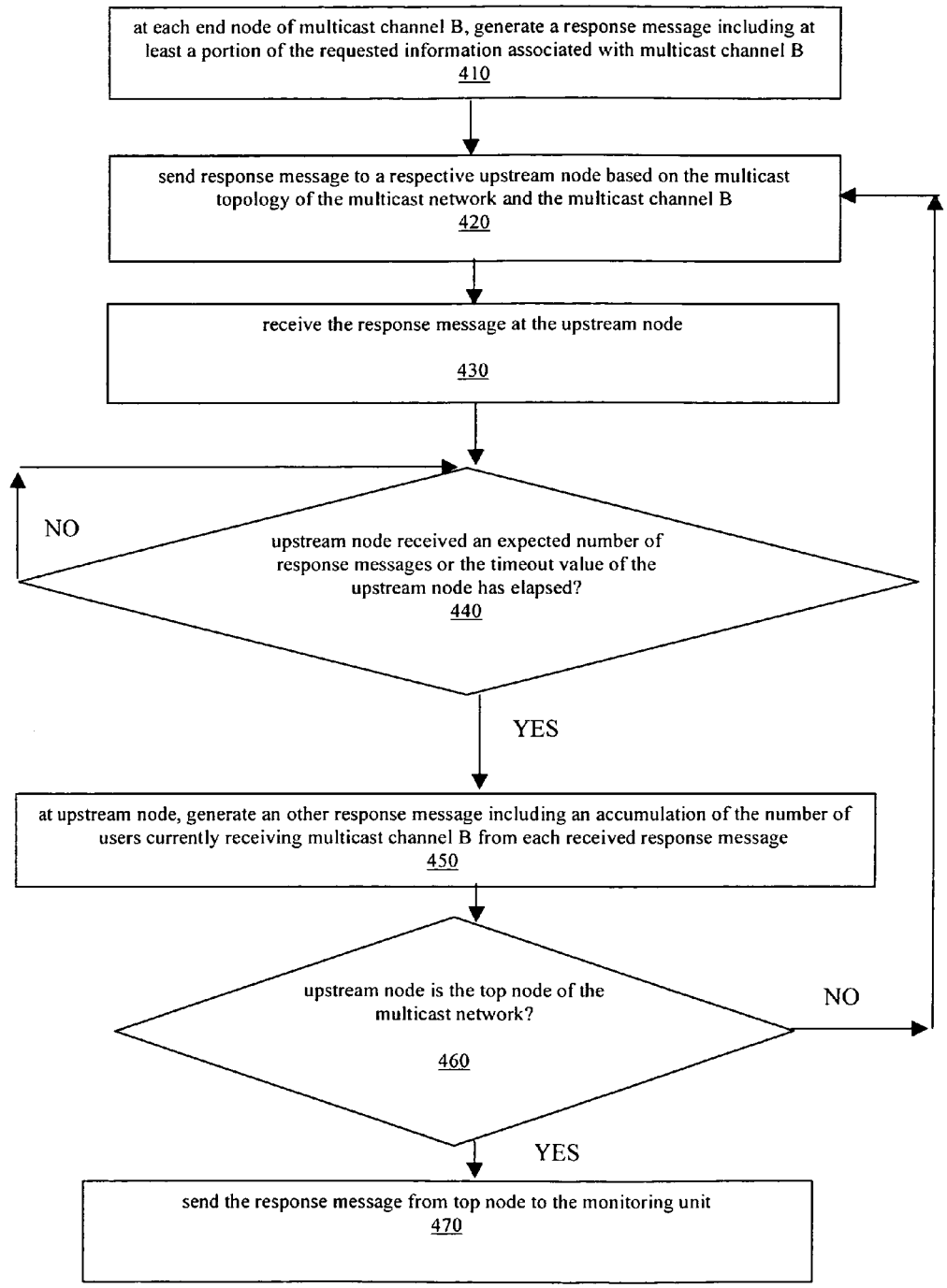
FIG. 4 illustrates a flow chart showing a response phase of a method of determining information associated with a particular multicast channel in a multicast network in accordance with an embodiment of the present invention.
Figure 5:
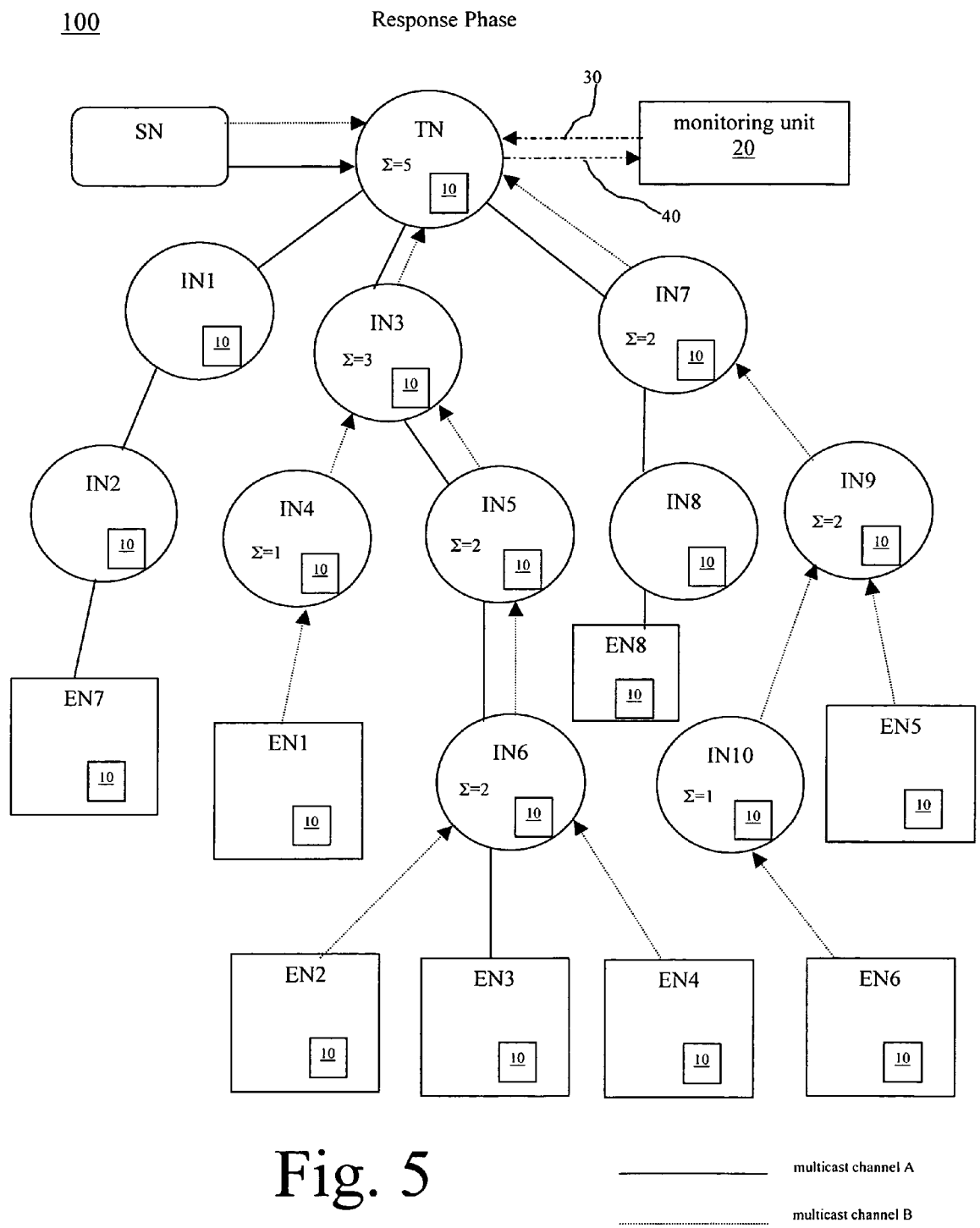
FIG. 5 illustrates the response phase of FIG. 4 performed in a multicast network in accordance with an embodiment of the present invention.

FIG. 4 illustrates a flow chart 400 showing a response phase of a method of determining information associated with a particular multicast channel in a multicast network in accordance with an embodiment of the present invention. Reference is made to FIG. 5, which illustrates the response phase of FIG. 4 performed in a multicast network 100 in accordance with an embodiment of the present invention. In an embodiment, the present invention is implemented as computer-executable instructions for performing the response phase of this method. The computer-executable instructions can be stored in any type of computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

Here, the particular multicast channel is multicast channel B. Moreover, the information is the number of users currently receiving multicast channel B. A response to the request message 30 is propagating upstream via the multicast topology of the multicast network 100 to generate a response message 40 including the requested information associated with multicast channel B.

At Block 410, each end node (e.g., end nodes EN1, EN2, EN4, EN5, and EN6 of FIG. 5) of multicast channel B in multicast network 100 generates a response message including at least a portion of the requested information associated with multicast channel B. In FIG. 5, each end node EN1, EN2, EN4, EN5, and EN6 of multicast channel B calculates the number of users currently receiving multicast channel B from the respective end node.

Ideally, an end node is the last device in a downstream network path for multicast channel B. For example, it may be a set-top-box (STB) or a computer that a user uses to watch multicast channel B. Moreover, the end node is configured to know that it is the last device and, therefore, should start generating the response back to the top of the multicast topological tree.

Alternatively, a second-to-the-last device may be the end node. For example, the residential gateway (RG) may be the last node. It is configured to know what is coupled downstream from it and what channel(s) it is currently distributing to the set-top-boxes (STB) or computers. Based on this knowledge, the residential gateway (RG) calculates the number of users currently receiving multicast channel B and starts generating the response back to the top of the multicast topological tree.

A third alternative is to have a network edge device (e.g., a Digital Subscriber Line Access Multiplexer (DSLAM)) be the end node. However, the granularity and accuracy of the requested information are loosened. Instead of knowing exactly how many set-top-boxes and computers are receiving multicast channel B, one may only find out how many households are currently subscribed to multicast channel B. This may be sufficient in some cases.

In any case, the end nodes accept and recognize the request messages from the upstream nodes. They then add up the number of multicast streams for multicast channel B that that they are currently distributing. If the end node is a set-top-box (STB), the number of users currently receiving multicast channel B is 1. Each end node generate a response including the number of users currently receiving multicast channel B. In FIG. 5, the end nodes EN1, EN2, EN4, EN5, and EN6 of multicast channel B are set-top-boxes (STB). Hence, the end nodes EN1, EN2, EN4, EN5, and EN6 generate a response message having 1 as the number of users currently receiving multicast channel B.

Continuing with FIG. 4, at Block 420, each end node sends its response message to a respective upstream node based on the multicast topology of the multicast network 100 and the multicast channel B. That is, the respective upstream node is the node that originally sent the request message to the end node. The request message indicates which node sent the request messages to provide a trace for the end node to send back a response message. In FIG. 5, end node EN1 sends its response to intermediate node IN4 while end node EN2 sends its response to intermediate node IN6. End node EN4 sends its response to intermediate node IN6 while end node EN5 sends its response to intermediate node IN9. Further, end node EN6 sends its response to intermediate node IN10.

At Block 430, an upstream node receives the response message. In FIG. 5, the upstream nodes from the end nodes (e.g., end nodes EN1, EN2, EN4, EN5, and EN6) for multicast channel B are intermediate nodes IN4, IN6, IN9, and IN10.

Moreover, at Block 440, it is determined whether each upstream node has received an expected number of response messages based on the multicast topology of the multicast network 100. That is, each upstream node expects to receive the same number of response messages as the number of request messages that it sent downstream. Moreover, it is determined whether the timeout value of the upstream node has elapsed.

In one embodiment, if the upstream node receives the expected number of response messages, the upstream node generates an other response message including an accumulation of the number of users currently receiving multicast channel B from each received response message, at Block 450. If a timeout value of the upstream node elapses, the upstream node generates an other response message including an accumulation of the number of users currently receiving multicast channel B from each received response message, at Block 450.

As illustrated in FIG. 5, the intermediate node IN4 has accumulated the number of users currently receiving multicast channel B from end node EN1 while intermediate node IN6 has accumulated the number of users currently receiving multicast channel B from end nodes EN2 and EN4. The intermediate node IN10 has accumulated the number of users currently receiving multicast channel B from end node EN6 while intermediate node IN9 has accumulated the number of users currently receiving multicast channel B from end node EN5 and intermediate node IN10.

Referring again to FIG. 4, at Block 460, it is determined whether the upstream node is the top node TN of the multicast network 100. If the upstream node is the top node TN of the multicast network 100, the top of the multicast network 100 has been reached and the response phase proceeds to Block 470. If the upstream node is not the top node TN of the multicast network 100, Blocks 420-460 are repeated using the upstream node. When the top of the multicast network 100 has been reached, the response phase ends proceeds to Block 470. In FIG. 5, none of upstream nodes (e.g., intermediate nodes IN4, IN6, IN9, and IN10) is the top node TN of the multicast network 100. Thus, Blocks 420-460 are repeated until the top (top node TN) of the multicast network 100 has been reached.

Furthermore, at Block 470, the top node TN sends the response message 40 generated at Block 450 to the monitoring unit 20. This response message 40 includes the requested information, which is an accumulation of the number of users currently receiving multicast channel B from the responses received by the top node TN from downstream nodes (e.g., intermediate nodes IN3 and IN7). In FIG. 5, the top node TN sends a response message having 5 as number of users currently receiving multicast channel B now.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of determining information associated with a particular multicast channel in a multicast network comprising a plurality of multicast channels, said method comprising:
   transmitting a program to a plurality of endpoints associated with said particular multicast channel, wherein said program is transmitted by a source node of said multicast network via a multicast topology of said particular multicast channel;
   generating a request message requesting said information associated with said particular multicast channel;
   propagating downstream said request message in a recursive manner via said multicast topology of said particular multicast channel, wherein said request message is propagated downstream after said program has begun to transmit;
   propagating upstream a plurality of response messages to said request message via said multicast topology of said particular multicast channel, wherein said plurality of response messages are propagated in response to said request message, and wherein said plurality of response messages comprises a number of said plurality of endpoints receiving said program transmission; and
   identifying said number of said plurality of endpoints receiving said program transmission via said multicast topology of said particular multicast channel based on said plurality of response messages.

2. The method as recited in claim 1, wherein said propagating downstream said request message in a recursive manner comprises:
   receiving said request message at a node of said multicast network;
   generating an other request message requesting said information associated with said particular multicast channel;
   sending said other request message to a downstream node based on said multicast topology and said particular multicast channel, wherein said other request message comprises an identification of said node that sent said other request to provide a trace to send said node a response; and
   receiving said other request message at said downstream node.

3. The method as recited in claim 2, wherein said propagating downstream said request message in a recursive manner further comprises:
   until said downstream node comprises an end node of said multicast network, repeating said generating said other request message, said sending said other request message to a downstream node, and said receiving said other request message at said downstream node.

4. The method as recited in claim 1, wherein said propagating downstream said request message in a recursive manner comprises:
   setting a timeout value at one or more nodes of said multicast network; and
   wherein said propagating upstream said plurality of responses to said request message comprises:

at an end node of said multicast network, generating a response message comprising said number of said plurality of endpoints receiving said program transmission from said end node;

sending said response message to an upstream node based on said multicast topology and said particular multicast channel;

receiving said response message at said upstream node; and after said timeout value elapses, accumulating said number of said plurality of endpoints receiving said program transmission from each received response message.

5. The method as recited in claim 1, wherein said propagating upstream said plurality of responses to said request message further comprises:

at an end node of said multicast network, generating a response message comprising said number of said plurality of endpoints receiving said program transmission from said end node;

sending said response message to an upstream node based on said multicast topology and said particular multicast channel;

receiving said response message at said upstream node; and after said upstream node receives an expected number of response messages from one or more end nodes based on said multicast topology, accumulating said number of endpoints receiving said program transmission from said expected number of response messages.

6. The method as recited in claim 1, wherein said particular multicast channel comprises a total number of registered endpoints, and wherein said number of said plurality of endpoints receiving said program transmission is less than said total number of registered endpoints.

7. An apparatus comprising:

means for transmitting a multimedia program to a plurality of endpoints via a multicast topology associated with a particular multicast channel of a multicast network;

means for propagating downstream a request message in a recursive manner via said multicast topology of said particular multicast channel, wherein said request message requests information associated with receipt of said multimedia program on said particular multicast channel, and wherein said request message is propagated after said multimedia program has begun to transmit;

means for propagating upstream a plurality of response messages to said request message via said multicast topology of said particular multicast channel, wherein each of said plurality of response messages comprises a number of said plurality of endpoints receiving said program transmission; and means for monitoring said multicast network to identify said number of said plurality of endpoints receiving said program transmission via said multicast topology of said particular multicast channel based on said plurality of response messages.

8. An apparatus comprising:

a network interface configured to operate in a multicast network; and a multicast channel monitoring module, wherein said multicast channel monitoring module facilitates said apparatus to propagate downstream a request message requesting information associated with a particular multicast channel of said multicast network in a recursive manner via a multicast topology of said multicast network, wherein said requested information comprises a number of users receiving said particular multicast channel, wherein said multicast channel monitoring module facilitates said apparatus to propagate upstream a response to said request message via said multicast topology to generate a response message including said requested information associated with said particular multicast channel, and wherein said multicast channel monitoring module receives said request message, generates an other request message requesting information associated with said particular multicast channel, sets a timeout value, and sends said other request message to a downstream node of said multicast network based on said multicast topology and said particular multicast channel.

9. The apparatus as recited in claim 8, wherein said multicast channel monitoring module receives said request message from an upstream node of said multicast network.

10. The apparatus as recited in claim 9, wherein said apparatus comprises an end node of said multicast network, and wherein said response comprises a number of endpoints receiving a multimedia program transmission from said end node for said particular multicast channel.

11. An apparatus comprising:

a network interface configured to operate in a multicast network; and a multicast channel monitoring module, wherein said multicast channel monitoring module facilitates said apparatus to propagate downstream a request message requesting information associated with a particular multicast channel of said multicast network in a recursive manner via a multicast topology of said multicast network, wherein said information comprises a number of users receiving said particular multicast channel, wherein said multicast channel monitoring module facilitates said apparatus to propagate upstream a response to said request message via said multicast topology to generate a response message including said requested information associated with said particular multicast channel, and wherein said multicast channel monitoring module generates an other response message including at least a portion of said requested information associated with said particular multicast channel, and sends said other response message to an upstream node of said multicast network based on said multicast topology and said particular multicast channel.

12. The apparatus as recited in claim 11, wherein said multicast channel monitoring module receives said response message from a downstream node of said multicast network, and wherein said other response message includes an accumulation of said number of users receiving said particular multicast channel when an expected number of response messages based on said multicast topology is received.

13. The apparatus as recited in claim 11, wherein said multicast channel monitoring module sets a timeout value, receives said response message from a downstream node of said multicast network, and wherein said other response message includes an accumulation of said number of users receiving said particular multicast channel when said timeout value elapses.

14. A computer-readable medium having instructions stored thereon, wherein if the instructions are executed by at least one device, the at least one device is configured to:

propagate to a plurality of downstream nodes a request message requesting information associated with a receipt of a multimedia program on a particular multicast channel of a multicast network, wherein said request message is propagated on said particular multicast channel of said multicast network via a multicast topology of said multicast network, wherein said request message is propagated after at least a portion of said multimedia program has been received on said particular multicast channel;

monitor said multicast network to identify a plurality of response messages to said request message; and identify a number of users receiving said multimedia program on said particular multicast channel according to a number of users identified in each of said plurality of response messages, wherein said plurality of response messages are propagated to an upstream node via said multicast topology associated with said particular multicast channel.

15. The computer-readable medium as recited in claim 14, wherein said request message is propagated by:

receiving said request message;

generating an other request message requesting said information associated with said particular multicast channel;

setting a timeout value; and sending said other request message to said plurality of downstream nodes of said multicast network based on said multicast topology and said particular multicast channel.

16. The computer-readable medium as recited in claim 14, wherein said request message is propagated by:

receiving said request message from an upstream node of said multicast network, wherein said request message comprises an identification of said upstream node that sent said request message to provide a trace to respond to said upstream node.

17. The computer-readable medium as recited in claim 14, wherein said plurality of downstream nodes comprise end nodes of said multicast network, and wherein each of said end nodes transmits said multimedia program to one or more of said number of users receiving said multimedia program on said particular multicast channel.

18. The computer-readable medium as recited in claim 14, wherein said particular multicast channel comprises a total number of registered users, and wherein said number of users receiving said multimedia program is less than said total number of registered users of said particular multicast channel.

19. The computer-readable medium as recited in claim 15, wherein said plurality of response messages are propagated by:

receiving said plurality of response messages from said plurality of downstream nodes; and generating a further response message including an accumulation of said number of users identified in each of said plurality of response messages when said timeout value elapses.

20. The computer-readable medium as recited in claim 14, wherein said upstream node comprises a top node of said multicast network, and wherein said plurality of downstream nodes comprise end nodes that transmit said multimedia program directly to said number of users.

21. The apparatus as recited in claim 7, wherein said multicast network comprises a plurality of multicast channels configured to transmit different multimedia programs to one or more of said plurality of endpoints.

22. The computer-readable medium as recited in claim 14, wherein said request message is propagated in a recursive manner.

23. The apparatus as recited in claim 8, wherein said particular multicast channel comprises a total number of registered users, and wherein said number of users receiving said particular multicast channel is less than said total number of registered users.

24. The method as recited in claim 3, wherein said end node is connected to said plurality of endpoints configured to receive said program transmission.

25. The method as recited in claim 1, wherein said program comprises a multimedia program.

26. The method as recited in claim 1, wherein said program comprises a video program.

\* \* \* \* \*